Figures 1, 2, 3:
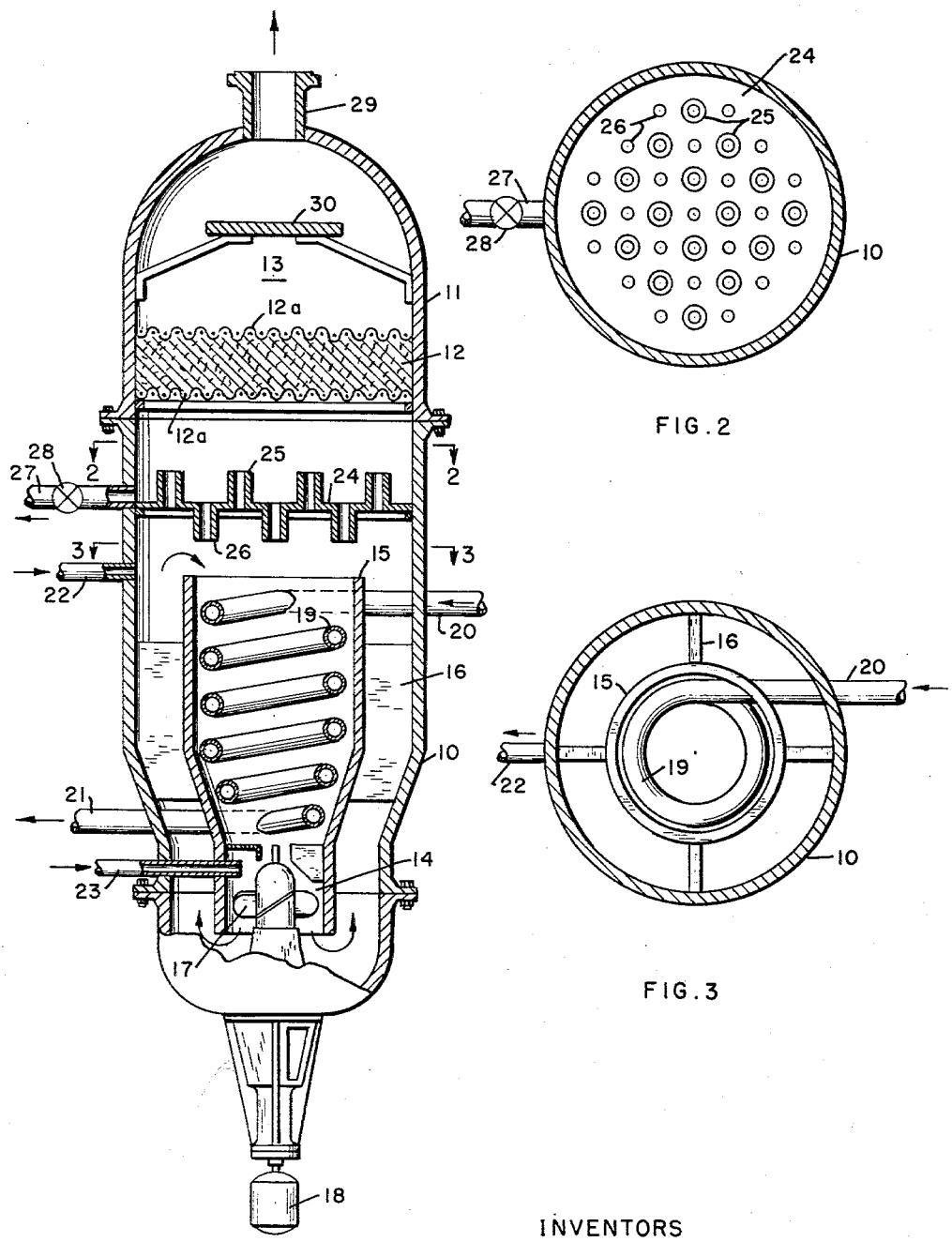

INVENTORS
ROBERT S. MILLER
JAMES L. RALPH
BY *Oswald W. Milmore*
THEIR ATTORNEY

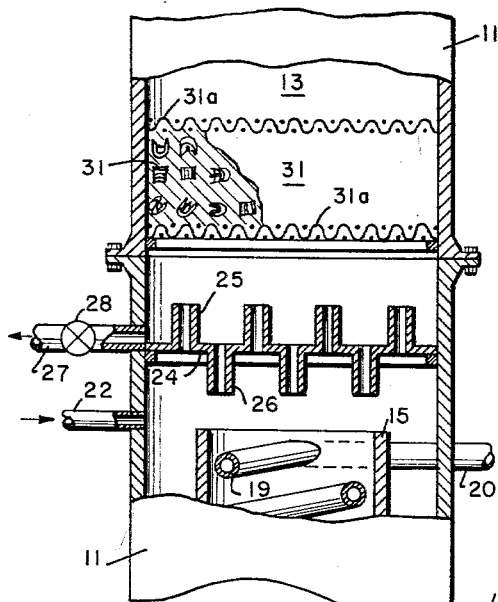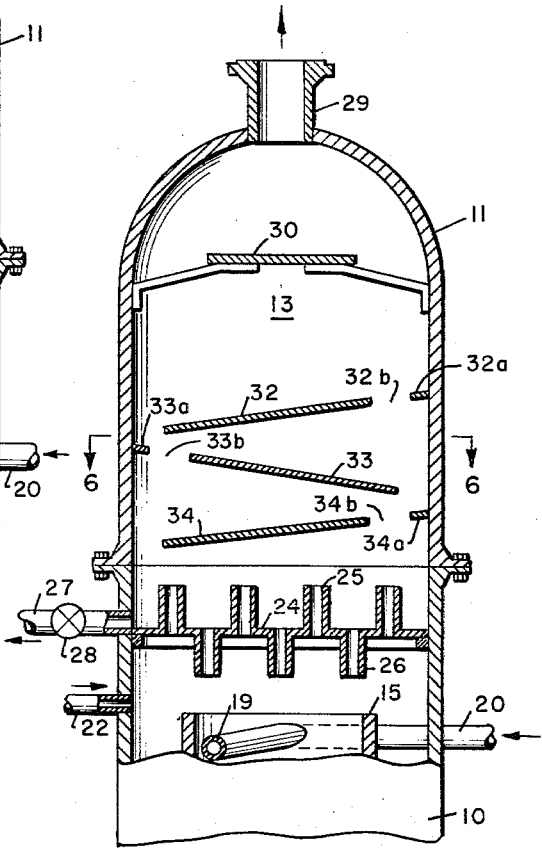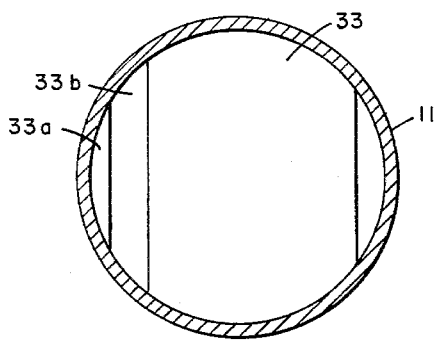

United States Patent Office 3,173,763
Patented Mar. 16, 1965

3,173,763
COMBINED MIXER AND SETTLER
Robert S. Miller and James L. Ralph, Oakland, Calif., assignors to Shell Oil Company, New York, N.Y., a corporation of Delaware
Filed Feb. 29, 1960, Ser. No. 11,606
6 Claims. (Cl. 23—285)

The invention relates to an integral mixing and settling device wherein two liquids are brought into contact and from which one of them can be continuously discharged after contact. The invention is of particular application to processes wherein there is little or no net flow of one of the liquids through the apparatus. Examples of such applications are the treatment of petroleum fractions, such as gasoline, with caustic soda, the so-called doctor treatment, and various chemical reactions such as liquid-phase butane isomerization and propylene-sulfuric acid reactions in the manufacture of isopropyl ether. In view of the transformation of one of the liquids in many instances, it will be understood that reference to one of the liquids herein, adopted for convenience, must be construed to include liquid derivatives of said liquid.

When prolonged and/or intimate contact between two liquids in a stirred contactor and their subsequent separation are desired, it is usual to carry out these operations in separate units. This has the drawback of requiring connecting piping and flow-control means or pumps, and, when the net flow of one of the liquids is nil or very low, means for returning this liquid to the mixer from the settler. This is necessary whenever the net throughput rate of one liquid is less than the rate at which it is removed from the mixer with the dispersion formed therein. Usually the liquid having the low net throughput forms the continuous phase.

Performing both the mixing and settling operations within the same vessel would in many cases simplify the process and reduce equipment costs, especially for operations conducted at superatmospheric pressure. However, intense mixing, when required for efficient mass transfer, makes settling difficult, and prior attempts to carry out the settling operation within the same vessel as the mixer and to return one of the liquids by gravity have for this reason not been successful.

It is the object of the invention to provide an improved contacting apparatus having a mixing and settling zone included within one vessel from which one of the liquids is returned to the mixing zone by gravity.

A further object is to improve the separation of the liquids from the dispersion in an apparatus of the type described in the preceding paragraph.

According to the invention it was found that such objects can be realized by mounting within a vessel a coalescer which is disposed to divide the vessel into vertically displaced mixing and settling zones, the former zone containing a stirrer and the latter having an outlet for one of the settled liquids at a level remote from the mixing zone, said coalescer providing extended surface area through a vertically elongated zone and having a large void space, preferably at least 60% of its volume, formed as a plurality of tortuous passages for the low-resistance flow of liquid in both directions, viz., of the dispersion toward the settling zone and the other one of the settled liquid in to the mixing zone.

By using a coalescer providing tortuous flow channels the liquid dispersion comes into effective contact with more surface for a given flow rate in a given time than when substantially straight channels, e.g., between parallel walls are used. Because such walls must be closely spaced, straight channels, to be effective, are so narrow as to restrict liquid flow.

Best results were obtained by using as the coalescer a wire mat at least three inches thick, said mat being made of fine wire which is woven, braided, knitted or packed, and which has a large void volume, amounting to above 85% and, usually, between 90 and 99% of the mat volume.

The coalescer may, however, also consist of a layer of small, discrete contacting bodies which provide a large wettable surface, such as rings or saddles, said layer being at least three inches thick and said bodies preferably having a void space in excess of 60% of its bulk and a wettable surface at least 20 sq. ft. per cu. ft. of bulk.

According to still another embodiment the coalescer can take the form of a series of at least three inclined, partly overlapping baffles which are spaced apart vertically and are inclined toward their free edges in the direction toward the mixing chamber. These baffles provide a low-resistance, zig-zag path for the liquid.

A further feature of the invention includes a collecting tray whereby a part of the settled liquid which returns from the coalescer to the mixing zone is collected and from which a part returns to the mixer while another part is bled off.

It will be understood that either the mixing or the settling zone may be higher, according as the liquid which is continuously discharged from the end of the settler settles downwardly or upwardly, respectively, from its dispersion.

The invention will be further described with reference to the accompanying drawings forming a part of this specification, wherein:

FIGURE 1 is a vertical sectional view of one embodiment of the invention;
FIGURES 2 and 3 are transverse sections taken on the lines 2—2 and 3—3, respectively, of FIGURE 1;
FIGURE 4 is a vertical sectional view of a part of a second embodiment of the invention;
FIGURE 5 is a vertical sectional view of a part of a third embodiment; and
FIGURE 6 is a transverse section taken on the line 6—6 of FIGURE 5.

Referring to FIGURES 1–3, the invention is illustrated as applied to an integral reactor-settler wherein the lighter liquid is discharged as the major stream and is contacted with a heavier liquid which is, for the greater part, retained in the vessel. The vessel includes lower and upper sections 10 and 11, divided by a coalescer 12 into an upper settling chamber 13 and a lower mixing chamber 14. The coalescer is a wire mat, for example, made of knitted fine steel wire having a diameter less than about 0.05 inch and having a void space of about 95%, and retained by coarse-mesh screens 12a. Typically the mat is from 2 to 8 inches thick, and mats at least three inches thick are preferred.

The mixing chamber contains a concentric, annular baffle 15, which constitutes a draft tube, mounted by radial walls 16 and open at the top and bottom. The constricted, lower part of the baffle contains a mixing impeller 17, driven by an electric motor 18 to effect circulation of liquid downward through the draft tube and upwards through the annular passage between it and the vessel wall. When desirable or necessary for controlling the temperature within the vessel, as when liquid undergoing an exothermic reaction must be cooled, suitable heat-exchange means are provided, such as a tightly wound coil 19 within the draft tube, through which a thermal cooling or heating fluid can be flowed via pipes 20 and 21. Inlets 22 and 23 are provided for supplying the liquids to be mixed. It should be noted that the coil 19 may itself constitute the upper portion of the draft tube 15, particularly if the coils are tightly wound.

When it is desired to bleed off from the vessel the liquid other than that which constitutes the major discharge stream, a collecting and distributing tray 24 may be mounted beneath the coalescer. This tray is in the form of a plate having a plurality of tubular riser ducts 25 and a plurality of tubular downcomer ducts 26. Liquid is discharged from the upper face of the tray via a pipe 27 at a low rate, controlled by a valve 28.

The settling chamber 13 may be empty above the coalescer 12 for a distance sufficient to permit settling of the dispersion which ascends through the coalescer. At the top is an outlet nozzle 29 for discharging settled lighter liquid. A baffle plate 30 is advantageously mounted beneath the inlet to the nozzle to prevent entry of liquid by direct flow and thereby minimize discharge of adventitious entrained globules of the heavier liquid.

In operation, as applied for example for the reaction of propylene with water in the presence of sulfuric acid to produce isopropyl ether, aqueous sulfuric acid is admitted to the mixer via the pipe 22, until the mixer is almost filled therewith. Thereafter additional water and/or aqueous acid, is admitted from time to time only as make-up or to replenish acid withdrawn via the pipe 27, as will be described, it being understood that the net through-flow of acid is low in relation to that of the hydrocarbons. A liquid hydrocarbon stream, rich in $C_3$ olefins, is admitted under pressure through the inlet 23 into the draft tube 15 for immediate dispersal in the acid, which is circulated by the mixing impeller 17 in the arrow direction shown. This creates a fine and intimate dispersion of the hydrocarbons in the acid phase and reaction to form isopropyl ether. After emerging from the top of the annular passage surrounding the draft tube most of the dispersion again descends through the tube. The reaction being exothermic, a coolant is circulated through the coil 19. A part of the dispersion ascends through the riser ducts 25 of the collector plate 24 and is distributed over the area of the coalescing mat 12. It flows through this mat, wherein the dispersed, small droplets of ether and unreacted hydrocarbon are coalesced to form larger globules. The coalesced mixture emerges from the upper side of the mat into the settling chamber 13, and the ether and hydrocarbon phase is discharged through the outlet 29. The rate of discharge may be regulated by suitable means, not shown, to insure that only the stated liquid flows off at the top. There being no other outlet in the settler, the settled sulfuric acid phase must descend through the mat 12 toward the collector plate 24, on which this phase collects and from which it flows, for the most part, down through the ducts 26 in isolation from the ascending dispersion and distributed over the area of the plate, to re-enter the circulating stream in the mixing chamber.

A controlled, minor fraction of the aqueous acid phase may be bled off continuously or intermittently from the plate 24 via the pipe 27. In this manner acid which is for any reason deteriorated, as by accumulation of carbonaceous matter, can be replaced by "make-up" acid admitted via the inlet pipe 22.

It will be appreciated that, in the described operation, the mixing vessel functions as a chemical reactor in which the hydrocarbon stream is contacted with a more or less static quantity of aqueous acid. The ratio of the phases within the mixing vessel can be controlled by varying the quantity of acid in the system. By providing a coalescing mat 12 the liquids within the settling chamber are effectively damped from the currents prevailing in the mixing section, and this action is aided by the collecting plate 24, when used. It was found that such an arrangement permits the ready return of the aqueous acid phase from the settler to the mixer by gravity, thereby eliminating external piping and flow-control devices; these are especially advantageous when the contacting is carried out at elevated pressure, as in the example given.

Other forms of coalescers may be used. As shown in FIGURE 4, the coalescer may take the form of a layer 31 of small, discrete contacting bodies made of ceramic, stainless steel, or other suitable material and retained between coarse-mesh screens 31a. These bodies may, for example, be Berl or Intalox saddles, Raschig rings, or other loose bodies which present large wettable surfaces, and a high free volume. They perform the function previously described for the mat. The thickness of such layer may be the same as previously given for the mat. Other reference numbers in this and the following view denote parts previously described.

FIGURES 5 and 6 illustrate the use of inclined baffles as the coalescer. In the preferred arrangement shown each inclined baffle comprises a principal lower segment, such as 32, 33 or 34, and a shorter, upper segment 32a, 33a or 34a, which is conveniently mounted coplanar with the lower segment and is separated therefrom by a gap 32b, 33b or 34b which extends transversely to the direction of greatest slope. These gaps are positioned as to be above or beneath the lower edge of another baffle, thereby obstructing any straight-line vertical path and constraining the dispersion to ascend to the settling chamber 13 only via a tortuous path. Successive baffles are inclined in opposite directions and are spaced far enough apart vertically, as shown, to afford a high void space or free volume; the gaps are also made wide, in about the relation to the baffle areas shown. These features insure a low-resistance flow for the liquids while both effectively damping the settling liquids against currents and causing coalescence of the dispersed liquid before entry into the settling chamber. Settled heavier liquid flows by gravity from the settling chamber along the upper surfaces of the baffles and rains down in part through the gaps and principally from the free edges at the lower ends of the principal baffle segments.

*Example*

The improved results obtainable with the construction according to the invention are evident from the following experimental data, obtained in a cylindrical vessel four inches in internal diameter. The mixing chamber contained a draft tube five inches tall and a two-inch propeller, and the settling zone at the top was seven inches in height. In these tests the continuous phase was a concentrated aqueous solution of $NaNO_3$ (45% w. $NaNO_3$, density 84.9 lbs./cu. ft., viscosity 0.00170 lb./sec./ft.), the bulk volume of which was held at about ¾ of the volume of the mixing chamber. Isooctane was admitted continuously and dispersed, the dispersion was settled in the settling chamber, and the settled isooctane was discharged at the top of the settler. The aqueous phase returned by gravity to the mixing chamber.

Successive tests were performed with five different models, equipped as follows:

(A) No coalescer or plate (control).

(B) A collector-distributor plate (as shown at 24 in the drawing).

(C) A coalescer consisting of a fine-wire mat (0.011-inch diameter wire, 15.4 lbs. per cu. ft. packing density, 97–98% void fraction) four inches thick.

(D) A coalescer consisting of three inclined baffles as shown in FIGURES 5 and 6.

(E) A coalescer consisting of three inclined baffles as shown in FIGURES 5 and 6 and a collector-distributor plate (as shown at 24 in the drawing).

| Model | Isooctane Flowrate, g.p.m. | Stirrer Speed, r.p.m. | Height of Interface Above Mixing Section, Inches |
|---|---|---|---|
| A | .3 | 800 | 3.9 |
| A | .5 | 800 | 6.5 |
| A | .3 | 1,000 | ¹ 7.0 |
| B | .3 | 800 | 2.4 |
| B | .6 | 800 | 7.0 |
| C | .7 | 1,000 | 0.5 |
| C | 1.4 | 1,000 | 2.5 |
| C | 1.4 | 1,800 | 4.2 |
| D | .6 | 800 | 1.9 |
| D | .6 | 1,000 | 4.1 |
| D | .6 | 1,200 | 7.0 |
| D | .7 | 1,000 | 5.9 |
| E | .6 | 800 | 3.1 |
| E | 1.3 | 1,000 | 6.4 |
| E | .6 | 1,200 | 5.6 |
| E | .9 | 1,000 | 5.6 |

¹ (Flooding.)

The data in the table show that the coalescence rate in the open settler (Model A) is relatively slow and, further, is very sensitive to stirrer speed. Coalescence rate is improved somewhat by the use of the distributor plate (Model B), and further improvement is obtained with the three inclined baffles alone (Model D). The unit with distributor plate plus three inclined baffles (E) is still more effective, permitting higher flow rates and stirrer speeds. However, the 4-inch thickness of wire mat (C) is by far the most effective device.

We claim as our invention:

1. Contacting apparatus for effecting continuous contact between liquids of different densities which are at least partially immiscible with each other, one of which has a net flow rate through the apparatus which is smaller than the rate at which it is removed from a mixing chamber therein as a part of a dispersion of said liquids, which comprises:
   (a) a vessel which contains a coalescer extending across the vessel and dividing the same into upper and lower chambers of which one is a settling chamber and the other a mixing chamber, the latter being situated with respect to the former in the settling direction of said one liquid,
   (b) said coalescer providing an extended surface and tortuous passage which are distributed in depth for the passage of liquid between said chambers in both directions,
   (c) a collecting tray situated within said mixing chamber adjacent to the coalescer having flow passages therethrough,
   (d) means for feeding said two liquids into said mixing chamber,
   (e) stirrer means within said mixing chamber for forming a dispersion of said liquids, therein,
   (f) said mixing and settling chambers being in flow communication through said passages in the tray and through the coalescer for the flow of said dispersion from the mixing chamber into the settling chamber and the return of said one liquid by gravity from the settling chamber to the mixing chamber,
   (g) said collecting tray including means to collect a part of said liquid which returns by gravity,
   (h) outlet means for discharging said collected liquid from said tray, and
   (i) outlet means for discharging the other of said liquids, after settling, from said settling chamber at a level displaced from the coalescer in a direction away from the mixing chamber.

2. Apparatus as defined in claim 1 wherein said collecting tray is formed as a plate and has ducts extending therefrom at ports toward the coalescer for the flow of said dispersion from the mixing chamber, and additional ducts extending therefrom at additional ports away from the coalescer for the return flow of a part of the collected liquid to the mixing chamber.

3. Apparatus according to claim 1 wherein said coalescer comprises a wire mat at least three inches thick extending across the vessel, said mat having composed of fine wire and having a void space amounting to between 85 and 99% of the gross mat volume.

4. Apparatus according to claim 1 wherein said coalescer comprises a layer of discrete, solid contacting bodies extending across the vessel, said layer being at least three inches thick and having a high wettable surface in relation to the volume of the layer.

5. Apparatus according to claim 1 wherein said coalescer comprises a plurality of at least three partly overlapping, vertically spaced baffles, each of said baffles extending from the vessel wall to a free edge and being inclined in the direction toward said mixing chamber in the flow direction toward said free edge for the drainage of said other liquid.

6. Contacting apparatus for effecting continuous contact between liquids of different densities which are at least partially immiscible with each other, one of which has a net flow rate through the apparatus which is smaller than the rate at which it is removed from a mixing chamber therein as a part of a dispersion of said liquids, which comprises:
   (a) a vessel which contains a coalescer extending across the vessel and dividing the same into upper and lower chambers of which one is a settling chamber and the other a mixing chamber, the latter being situated with respect to the former in the settling direction of said one liquid,
   (b) said coalescer providing an extended surface and tortuous passages which are distributed in depth for the passage of liquid between said chambers in both directions,
   (c) means for admitting said two liquids continuously into said mixing chamber,
   (d) baffle means within said mixing chamber defining a circulating path and stirrer and impeller means within the said chamber for forming a dispersion of said liquids and circulating said dispersion through said path,
   (e) outlet means for said settling chamber to discharge said other liquid, after flow as a part of said dispersion through the coalescer and subsequent settling, from a level of the settling chamber which is remote from the mixing chamber,
   (f) said settling chamber being closed at the level thereof near the coalescer whereby said one liquid, after settling therein, returns by gravity through the coalescer to the mixing chamber, and
   (g) means within said mixing chamber for intercepting a part of said one liquid flowing by gravity and for discharging a part of said one liquid from the apparatus.

References Cited by the Examiner
UNITED STATES PATENTS

| | | | |
|---|---|---|---|
| 2,526,478 | 10/50 | Hoffman et al. | 210—208 |
| 2,614,649 | 10/52 | Walker et al. | 210—23 X |
| 2,721,790 | 10/55 | Olney | 23—270.5 X |
| 2,729,549 | 1/56 | Reman et al. | 23—270.5 X |

MORRIS O. WOLK, *Primary Examiner.*

HERMAN BERMAN, HERBERT L. MARTIN, JAMES H. TAYMAN, Jr., *Examiners.*